(12) United States Patent
Pettersson (10) Patent No.: US 11,472,410 B2
(45) Date of Patent: Oct. 18, 2022

(54) SYSTEM AND METHOD FOR ACTUATOR INITIATED LAUNCH OR LINE LOCK CONTROL

(71) Applicant: Ford Global Technologies, LLC, Dearborn, MI (US)

(72) Inventor: Lars Niklas Pettersson, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/196,360

(22) Filed: Mar. 9, 2021

(65) Prior Publication Data

US 2022/0289196 A1 Sep. 15, 2022

(51) Int. Cl.
*B60W 10/184* (2012.01)
*B60W 30/18* (2012.01)
*B60W 10/06* (2006.01)
*B60W 10/02* (2006.01)

(52) U.S. Cl.
CPC ...... *B60W 30/18027* (2013.01); *B60W 10/02* (2013.01); *B60W 10/06* (2013.01); *B60W 10/184* (2013.01); *B60W 30/18145* (2013.01); *B60W 2520/10* (2013.01); *B60W 2540/10* (2013.01); *B60W 2540/12* (2013.01); *B60W 2710/021* (2013.01); *B60W 2710/06* (2013.01); *B60W 2710/18* (2013.01); *B60W 2720/28* (2013.01)

(58) Field of Classification Search
CPC ...... B60T 7/12; B60T 8/26; B60W 30/18027; B60W 10/84; B60W 10/06; B60W 2540/12; B60W 2540/10; B60W 2720/28; B60W 2710/06; B60W 2520/10; B60W 2710/18
See application file for complete search history.

(56) References Cited

U.S. PATENT DOCUMENTS

| | | | |
|---|---|---|---|
| 6,406,103 B1 | 6/2002 | Elliott et al. | |
| 8,297,717 B2 | 10/2012 | Miynarczyk | |
| 9,676,390 B2 | 6/2017 | Fairgrievs et al. | |
| 9,731,721 B1 | 8/2017 | Wilder et al. | |
| 10,745,012 B2 | 8/2020 | Bergin | |
| 10,882,524 B2 * | 1/2021 | Cunningham | B60W 30/18027 |
| 2017/0190228 A1 * | 7/2017 | Handzel, Jr. | B60W 30/02 |
| 2020/0122534 A1 | 4/2020 | Glugla et al. | |

FOREIGN PATENT DOCUMENTS

| | | | | |
|---|---|---|---|---|
| GB | 2580390 A | | 7/2020 | |
| GB | 2580391 A | * | 7/2020 | B60T 7/12 |

* cited by examiner

*Primary Examiner* — Roger L Pang
(74) *Attorney, Agent, or Firm* — Burr & Forman LLP (57) ABSTRACT

A control system for a vehicle may include a brake assembly having a brake actuator that operates brakes to apply braking forces to wheels of the vehicle when actuated, a propulsion system having a propulsion actuator operable to apply propulsive forces to at least some of the wheels when actuated, a hand-operated actuator, and processing circuitry operably coupled to the hand-operated actuator, the propulsion system, and the brake assembly to apply a balancing brake force to balance the propulsive forces generated based on actuation of the propulsion actuator while the vehicle is below a threshold speed and both the hand-operated actuator is actuated and the brake actuator is not actuated, and release the braking forces when the hand-operated actuator is released.

8 Claims, 6 Drawing Sheets

SYSTEM AND METHOD FOR ACTUATOR INITIATED LAUNCH OR LINE LOCK CONTROL

TECHNICAL FIELD

Example embodiments generally relate to vehicle control technology and, more particularly, relate to a system and method for enabling an actuator (e.g., a drift stick) to be used for initiation of vehicle launch or burnout with electronically controlled assistance.

BACKGROUND

Vehicles today can span a wide spectrum in terms of the features they employ. From base models that may have very few features to high end packages that are loaded with features, the inclusion of features and the ability to control them can be important sales drivers for vehicle manufacturers. Some of the features vehicles may offer relate to onboard accessories, whereas others may directly impact certain basic control functions of the vehicle to enhance the ability of the driver to engage in certain activities (e.g., parking, off-road driving, stability control, etc.).

High performance vehicles may be used by drivers to engage in specific control functions such as initiating a drift, a burnout, or launching the vehicle off the start line. These functions are typically handled manually by the driver using specific control options associated with each vehicle. In many cases, a vehicle hand brake may play a role in initiation of the control functions listed above (e.g., drift, burnout and launch). However, the driver typically does so with manual operation of any vehicle controls (e.g., brake pedal, accelerator pedal, the hand brake, etc.). This results in the execution of the control functions being very much tied directly to the skill level and experience of the driver. Thus, it may be desirable to provide some assistance via automatic control over certain control functions so that results may be achieved more consistently or even in a shorter time in order to provide an improved user experience.

BRIEF SUMMARY OF SOME EXAMPLES

In accordance with an example embodiment, a vehicle control system for a vehicle may be provided. The control system may include a brake assembly having a brake actuator that operates brakes to apply braking forces to wheels of the vehicle when actuated, a propulsion system having a propulsion actuator operable to apply propulsive forces to at least some of the wheels when actuated, a hand-operated actuator, and processing circuitry operably coupled to the hand-operated actuator, the propulsion system, and the brake assembly to apply a balancing brake force to balance the propulsive forces generated based on actuation of the propulsion actuator while the vehicle is below a threshold speed and both the hand-operated actuator is actuated and the brake actuator is not actuated, and release the braking forces when the hand-operated actuator is released.

In another example embodiment, an alternative vehicle control system may be provided. The system may include a brake assembly having a brake actuator that operates brakes to apply braking forces to wheels of the vehicle when actuated, a propulsion system having a propulsion actuator operable to apply propulsive forces to at least some of the wheels when actuated, a hand-operated actuator, and processing circuitry operably coupled to the hand-operated actuator, the propulsion system, and the brake assembly to initiate a line-lock feature responsive to receipt of a burnout indication provided by an operator of the vehicle when vehicle speed is below a threshold and the hand-operated actuator is actuated. The burnout indication may include actuating the brake actuator greater than a first period of time, and subsequently fully actuating the propulsion actuator for greater than a second period of time.

In another example embodiment, a vehicle control system may be provided. The system may include a brake assembly operable to alternately enable rear wheels to be stopped independent of front wheels in a drift mode or enable the front wheels to be stopped independent of the rear wheels in a line-lock mode, a driver-operable actuator that is actuated to select the drift mode or the line-lock mode based at least in part on vehicle speed, and processing circuitry operably coupled to the actuator. The processing circuitry may initiate the drift mode when the vehicle speed is above a speed threshold when the actuator is actuated, and initiate the line-lock mode when the vehicle speed is below the speed threshold when the actuator is actuated and a burnout indication is received.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, certain vehicle control functions for high performance vehicles are typically performed entirely under the manual control of operators. For example, a hand brake or transmission brake in a high performance vehicle may be actuated by the driver as part of initiating certain vehicle control functions. In this regard, the operator may utilize the hand brake to hold the vehicle stationary while also manually controlling a torque source (e.g., engine, eMotor, etc.) in order to execute a launch (e.g., a rapid acceleration from an initial stationary state). The operator may alternatively use the hand brake to hold the vehicle stationary while one set of wheels spin to perform a burnout. In still other alternatives, the operator may use the hand brake to bring one set of wheels to a stop while the vehicle is in motion to initiate a sliding maneuver that is called "drift." Example embodiments may utilize a hand brake or other actuator, which may be referred to as a "drift stick," in order to employ automatic control functions associated with initiating any or all of the example control functions described above (i.e., drift, launch and burnout). In some cases, brake-by-wire technology (i.e., the control of brakes through electronic means) may be used in combination with the drift stick (or other actuator) to initiate such automatic control.

Figure 1:
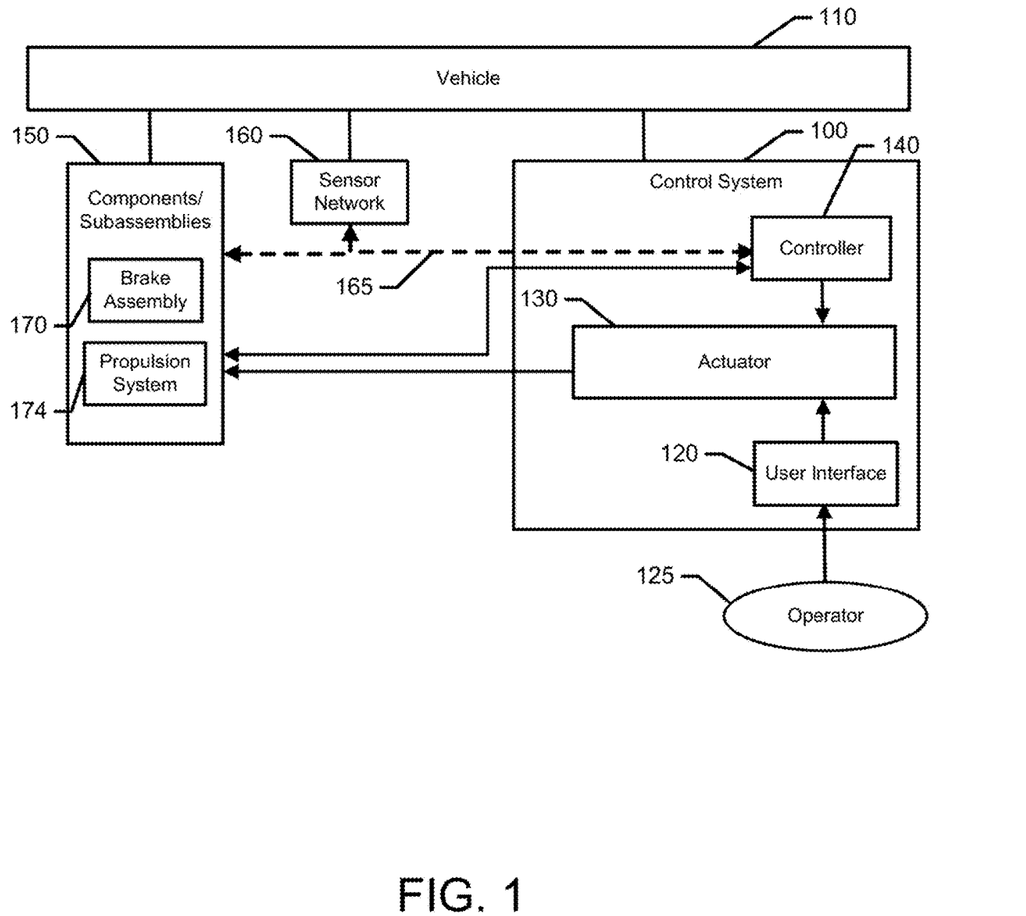
FIG. 1 illustrates a block diagram of a vehicle control system in accordance with an example embodiment.

FIG. 1 illustrates a block diagram of a control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the elements of FIG. 1 may be operably coupled to the vehicle 110, it should be appreciated that such connection may be either direct or indirect. Moreover, some of the elements of the control system 100 may be connected to the vehicle 110 via intermediate connections to other elements either of the chassis or of other electronic and/or mechanical systems or components.

The control system 100 may include one or more instances of subsystems that are dedicated to various aspects of vehicle operation, control, etc. Some of all of these various subsystems may be controlled via a user interface 120 by an operator 125. The operator 125 may therefore utilize the user interface 120 to select any of various selectable other modes of operation, and/or interact with the subsystems mentioned above in order to alter various settings associated with the respective subsystems. The user interface 120 may be embodied by an interactive display in the vehicle 110, and/or may include one or more function buttons, switches, levers, pedals and/or the like, which may be disposed in any or all of the dashboard, console, steering wheel, door, floor, or any other part of the vehicle 110. The display may provide one or more instances of a soft switch for actuation of various corresponding functions. However, in other examples, the user interface 120 may include only hard switches, buttons, keys, or other selectable operators located in the cockpit of the vehicle 110. Combinations of hard and soft switches are also possible.

The control system 100 of example embodiments may also include an auxiliary brake actuator 130 (referred to hereinafter simply as "actuator"), which may include, be part of or otherwise be operably coupled to a controller 140. In some cases, the actuator 130 may also or alternatively be part of or be operably coupled to the user interface 120. The actuator 130 may be configured to enable the initiation or control of multiple vehicle control functions as described herein based on inputs from any or all of the controller 140, the user interface 120 or other components of the vehicle 110. In some cases, the controller 140 may be part of an electronic control system of the vehicle 110 that is configured to perform other tasks related or not related to subsystem management. However, the controller 140 could be a dedicated or standalone controller in some cases.

In an example embodiment, the controller 140 may receive information that is used to determine vehicle status from various components or subassemblies 150 of the vehicle 100. Additionally or alternatively, various sensors that may be operably coupled to the components or subassemblies 150 may be included, and may provide input to the controller 140 that is used in determining vehicle status. Such sensors may be part of a sensor network 160 and sensors of the sensor network 160 may be operably coupled to the controller 140 (and/or the components or subassemblies 150) via a vehicle communication bus (e.g., a controller area network (CAN) bus) 165.

The components or subassemblies 150 may include, for example, various components associated with a driveline, powertrain, and/or chassis of the vehicle 110. Thus, the components or subassemblies 150 may include various components or subsystems such as, for example, a steering assembly, a brake assembly 170, a propulsion system 174, a wheel assembly, exhaust assembly, suspension assembly, fuel assembly, front/rear differential, etc., of the vehicle 110. In an example embodiment, the actuator 130 and the controller 140 may work together to implement certain specific drive control functions associated with operation of the brake assembly 170 and the propulsion system 174 as described below.

In some embodiments, the controller 140 may be configured to receive inputs from the operator 125 via the user interface 120 defining a mode or modes that may enable certain switches, buttons, etc., to be correlated to corresponding predefined functions. For example, one of the modes may enable the actuator 130 to be used to initiate one or more functions associated with the example embodiments described herein. However, in other alternatives, the actuator 130 may be configured to function as described herein by default, and may not need to be activated by any mode selection. If the actuator 130 functions differently in corresponding different modes, in at least one of those modes, the actuator 130 may be configured to initiate operation of the braking assembly 170 in association with coordinated control of the propulsion system 174 as described herein. If mode dependency does not exist, then the actuator 130 is configured by default to initiate operation of the braking assembly 170 in association with coordinated control of the propulsion system 174 as described herein.

In an example embodiment, the actuator 130 may be configured to be operated by the operator manually (e.g., by hand or foot) and, when operated, the controller 140 may interface with one or more sensors of the sensor network 160 to coordinate activation of the brake assembly 170 and/or propulsion system 174. In this regard, the operation (or actuation) of the actuator 130 may cause the controller 140 to monitor certain conditions of the vehicle 110 (e.g., speed) and certain other states of components of the brake assembly 170 and/or propulsion system 174 in order to execute various driving functions such as drift, burnout and/or launch. While these functions are often executed by experienced drivers using entirely manual control of brake, accelerator and/or clutch pedals along with a hand brake, in some cases, example embodiments enable automatic initiation of these functions when operator intent to execute each respective one can be inferred or determined.

The inference or determination of operator intent may be handled by the controller 140 based on vehicle speed and the order and timing of activation of certain components or actuators of the brake assembly 170 and/or propulsion system 174. For example, the order and/or timing of the actuation of a brake pedal and an accelerator pedal of the brake assembly 170 and the propulsion system 174, respectively, may be used by the controller to determine operator intent. In some examples, the controller 140 may be configured to execute an algorithm based on inputs indicative of the order and/or timing of the actuation of the brake pedal and the accelerator pedal along with the position of the actuator 130 in order to determine whether and how to initiate control over the brake assembly 170 and/or propulsion system 174 to initiate functions such as drift, burnout and/or launch as described herein.

Figure 2:
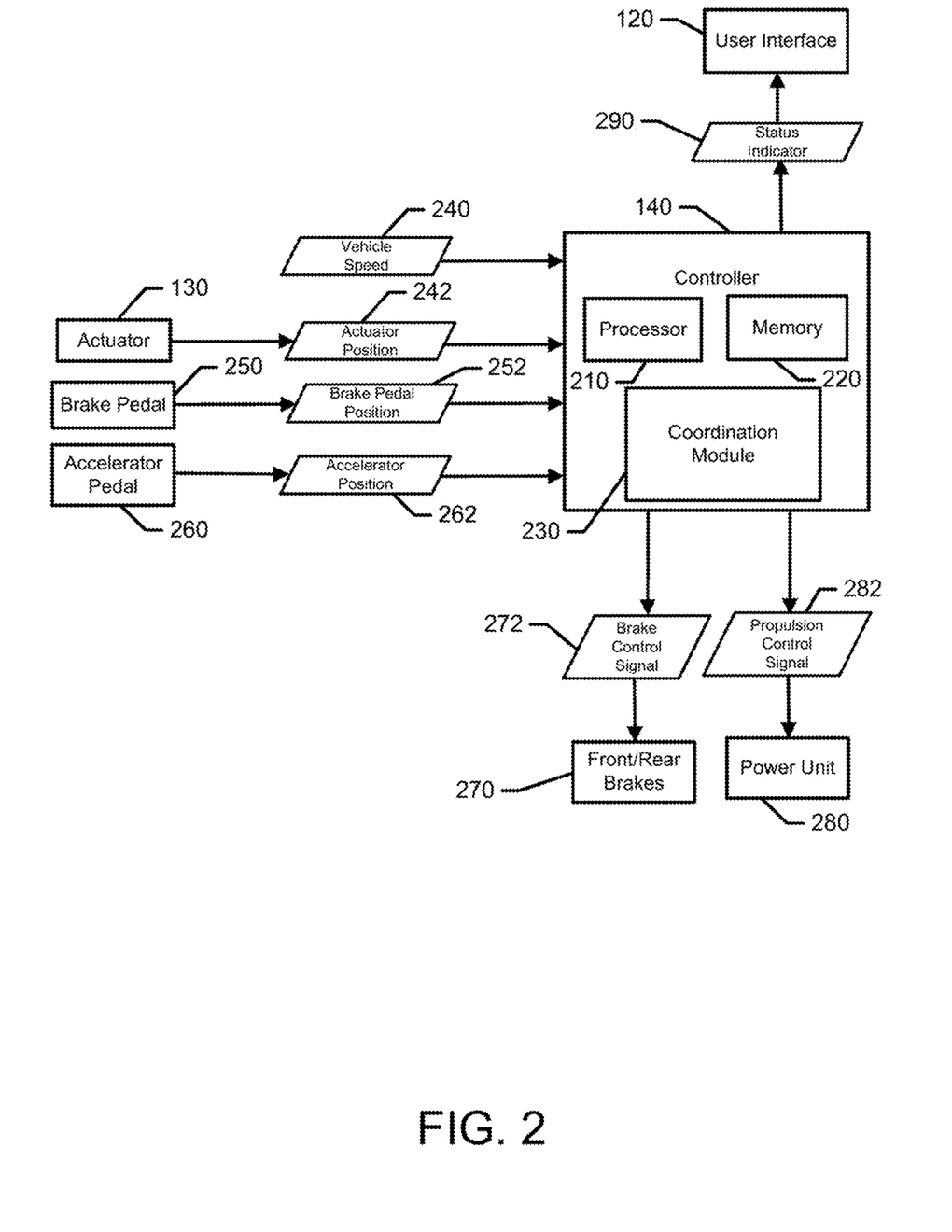
FIG. 2 illustrates a block diagram of some components of the vehicle control system of FIG. 1 in accordance with an example embodiment.

FIG. 2 illustrates a block diagram of some components of the control system 100, the brake assembly 170 and the propulsion system 174 in greater detail. In this regard, for example, FIG. 2 illustrates example structure for monitoring and/or controlling interactions between the actuator 130 and various components of the brake assembly 170 and the propulsion system 174 of FIG. 1. Processing circuitry (e.g., a processor 210 and memory 220) at the controller 140 may process the information received by running one or more control algorithms and/or control modules. The control algorithms/modules may include instructions that can be stored by the memory 220 for retrieval and execution by the processor 210. Thus, the processing circuitry should be understood to be capable of being embodied as a circuit chip (e.g., an integrated circuit chip) or other functional entity configured (e.g., with hardware, software executed on hardware, or a combination of hardware and software) to perform operations described herein.

The processor 210 may be configured to execute the control algorithms/modules in series or in parallel. However, in an example embodiment, the processor 210 may be configured to execute multiple control algorithms/modules in parallel (e.g., simultaneously) and substantially in real time. The control algorithms/modules may therefore execute various functions based on the information or instructions received, and generate outputs to drive the activities of the controller 140 as described herein. The controller 140 may therefore itself be embodied as the executor of a control algorithm, or may include control algorithms in the form of functional modules (or sub-modules) configured to perform specific functions for which they are configured relating to handling various configuration settings the vehicle 110 in the manner described herein.

In an example embodiment, the controller 140 may include a coordination module 230 (which may be embodied by the processor 210 and memory 220—or other instances thereof, and which may be an example of the functional modules described above). The coordination module 230 may be configured to interface with the subsystems associated with the brake assembly 170 and the propulsion system 174 of FIG. 1 to provide the control functions described above. Thus, for example, the control module 230 may receive inputs including vehicle speed 240 (e.g., from the sensor network 160 of FIG. 1). The vehicle speed 240 may be measured as an average of front wheel speeds, an average of rear wheel speeds, an average of all wheel speeds, and/or actual vehicle speed (e.g., as determined by GPS or other measurement means).

The control module 230 may also receive information such as actuator position 242 from the actuator 130 or a sensor of the sensor network 160 that is configured to monitor the position of the actuator 130 (i.e., actuated (pulled) or not actuated (released)). The control module 230 may also receive information indicative of a position of a brake pedal 250 (i.e., brake pedal position 252) either directly from the brake pedal 250 or from a sensor of the sensor network 160 that is configured to monitor the position of the brake pedal 250. The control module 230 may also receive information indicative of a position of an accelerator pedal 260 (i.e., accelerator pedal position 262) either directly from the accelerator pedal 260 or from a sensor of the sensor network 160 that is configured to monitor the position of the accelerator pedal 260.

The brake pedal 250 may be a part of the brake assembly 170 of FIG. 1 along with front and/or rear brakes 270. In an example embodiment, the brake assembly 170 may be a brake-by-wire system that enables electronic control of the braking functions initiated at the front and/or rear brakes 270. Thus, for example, a selected one or both of the front and/or rear brakes 270 may be actuated based on the application of a brake control signal 272, which may be generated by the controller 140 (or more specifically by the coordination module 230). Instances of the brake control signal 272 may also be initiated directly responsive to actuation of the brake pedal 250. However, such direct control is not the focus of example embodiments. Instead, example embodiments relate to automated control of the provision of an instance of the brake control signal 272 based on the inference or determination of intent of the operator 125 to initiate a drift, burnout or launch as described herein.

The accelerator pedal 260 may be a part of the propulsion system 174 of FIG. 1 along with power unit 280. In an example embodiment, the power unit 280 may be a vehicle engine, eMotor or other propulsion source for the vehicle 110. Thus, for example, power generated by the power unit 280 may be increased or decreased based on the application of a propulsion control signal 282, which may be generated by the controller 140 (or more specifically by the coordination module 230). Instances of the power control signal 272 may also be initiated directly responsive to actuation of the accelerator pedal 260. However, such direct control is not the focus of example embodiments. Instead, example embodiments relate to automated control of the provision of an instance of the propulsion control signal 282 based on the inference or determination of intent of the operator 125 to initiate a drift, burnout or launch as described herein.

During operation, the coordination module 230 may receive information including vehicle speed 240, actuator position 242, brake pedal position 252 and accelerator position 262. Based on these inputs, including potentially measurements of the time and/or values associated with each one, the coordination module 230 may be configured to issue control signals including the power control signal 282 and/or the brake control signal 272 to initiate a drift, burnout or launch. Although not required, the coordination module 230 may also initiate a status indicator 290 to the user interface 120 in order to indicate a current state (e.g., drift mode enabled, launch mode enabled, or burnout mode enabled) to the operator 125.

Figure 3:
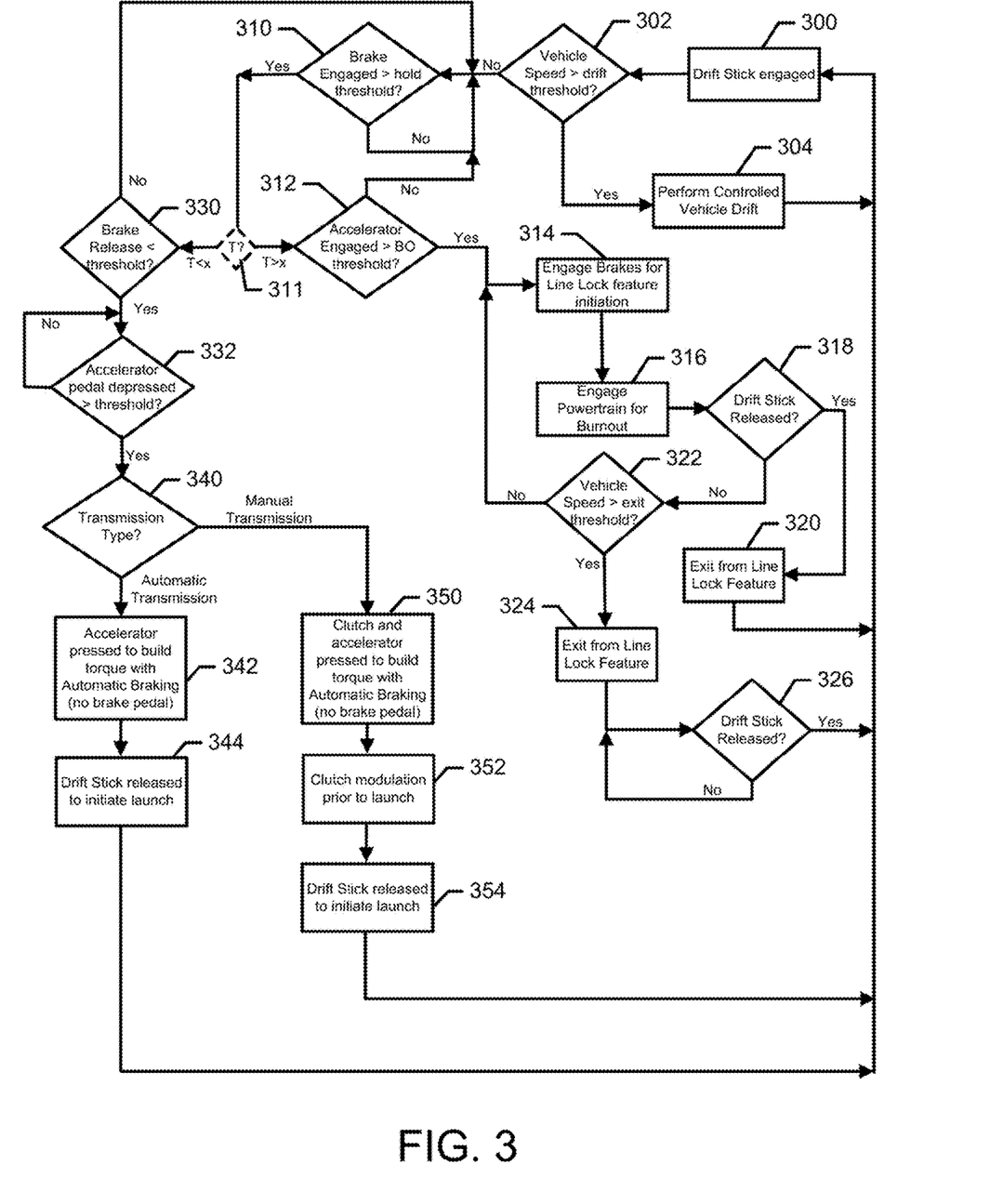
FIG. 3 illustrates a block diagram showing process flow associated with operation of a coordination module in accordance with an example embodiment.

FIG. 3 illustrates a block diagram showing process flow associated with operation of the coordination module 230 in accordance with an example embodiment. As such, FIG. 3 illustrates how operator intent is determined, and further how the coordination module 230 may direct coordination of assets associated with the brake assembly 170 and propulsion system 174 to initiate a drift, burnout or launch. As shown in FIG. 3, example embodiments may operate based on a position of the actuator 130. In the example of FIG. 3, the actuator 130 may be referred to as a "drift stick" since the actuator 130 is embodied as a hand brake lever that is operable to initiate a drift of the vehicle 110. However, the term "drift stick" is in no way limiting, since the actuator 130 can also or alternatively cause a launch operation or a burnout. Moreover, the actuator 130 need not necessarily be a hand brake lever, and could therefore not be a "stick" in other examples also. Similarly, although the brake pedal 250 and the accelerator pedal 260 are specifically mentioned above, each is merely an example of a respective actuator (i.e., a brake actuator and a propulsion actuator respectively) that are used to apply braking forces and propulsive forces, and such actuators need not necessarily take the form of a pedal in all cases.

Referring now to FIG. 3, when the drift stick is engaged at operation 300, the coordination module 230 may monitor various vehicle conditions to guide operations through the process flow of FIG. 3. A key determinant as to how process flow proceeds may be the speed of the vehicle 110. In this regard, as discussed above in reference to FIG. 2, vehicle speed 240 may be provided to the coordination module 230. When the drift stick is engaged at operation 300 a determination may be made as to whether the vehicle speed is greater than a drift threshold at operation 302. The drift threshold may be a speed sufficient to cause drift (e.g., 20 mph). If the vehicle speed is greater than the drift threshold when the drift stick is engaged, a controlled vehicle drift may be initiated at operation 304. In some cases, operation 304 may include sub-operations including the decoupling of the driven wheels so that power can be applied to some wheels while braking is applied to others to initiate drift.

If instead, vehicle speed is below the drift threshold at operation 302, then either a launch or burnout may potentially be executed based on the further process flows shown in FIG. 3. In this regard, for example, the coordination module 230 may monitor the brake pedal position 252 signal, and measure the time over which such signal is provided. A determination may then be made at operation 310 as to whether the brakes have been applied for greater than a hold threshold. The hold threshold may represent a period of time or a brake pressure. When referring to time, the hold threshold may represent a period of time over which engagement of the brakes is likely to leave the vehicle 110 stationary from the drift threshold speed in some case (or at least at a very low speed). If the brake is not engaged for at least the hold threshold, process flow may continue to cycle through a loop that detects when the hold threshold is met. However, if the hold threshold is met at operation 310, then continued process flow may distinguish between launch operations or burnout operations.

In this regard, a process flow leading to a potential burnout operation may be initiated if, after it has been determined that the brakes have been engaged greater than the hold threshold (in terms of pressure or time), the accelerator is simultaneously engaged for greater than a burnout (BO) threshold as shown by operation 312. Notably, the BO threshold could be a value in either the time domain or a value that represents a certain percentage of the full range of movement (e.g., angular movement) of the pedal. If the accelerator is not engaged more than the BO threshold, then process flow may return to operation 310. However, if the accelerator has been engaged more than the BO threshold at operation 312, then brakes may be engaged for initiation of a line-lock feature at operation 314. The line-lock feature may generally be understood to include the provision of the ability for front brakes to be locked independently of the rear brakes via a switch. Thus, initiation the line-lock feature at operation 314 may include engagement of the front brakes (e.g., by provision of the brake control signal 272 to engage the front brakes 270) via brake-by-wire. The front brakes may be applied to keep the front wheels at a zero (or near zero speed) while the line-lock feature remains engaged. After the front wheels have had braking applied to keep the speed thereof near zero at operation 314, the powertrain (e.g., the power unit 280) may be engaged for burnout at operation 316.

Operation 316 may include, responsive to the operator 125 pressing the accelerator pedal 260, operating the power unit 280 (via control by the propulsion control signal 282) to a controlled or maximum RPM value. Operation 316 may also include keeping the front brakes engaged while rear wheel speed increases to a controlled (or maximum) value as driven by the RPM value generated by the power unit 280. The front wheels will hold the vehicle stationary, while the rear wheels spin to perform the burnout at operation 316.

A check may then be made at operation 318 to determine if the drift stick has been released. If the drift stick has been released, then an immediate exit from the line-lock feature may be executed at operation 320. The exit from the line-lock feature may include removal of front brake pressure associated with line-lock (except to the extent such pressure is directly requested based on operator actuation of the brake pedal 250, as such inputs may be honored in association with regular pedal torque mapping).

It may also be possible to exit the line-lock feature and burnout operation without immediate release of the drift stick. For example, if vehicle speed increases to exceed an exit threshold (meaning the front wheel braking has not been sufficient to hold the vehicle stationary) at operation 322, then operation 324 may alternately be entered as shown in FIG. 3. Operation 324 may (like operation 320) include an exit from the line-lock feature by removal of front brake pressure associated with line-lock (except to the extent such pressure is directly requested based on operator actuation of the brake pedal 250, as such inputs may be honored in association with regular pedal torque mapping). Continuous checking may then occur to see if the drift stick is released at operation 326. If the drift stick is not released, a cycle may be made through operation 326 until such release is detected. No new initiation of line-lock and/or burnout may be initiated in this cycle, and the drift stick is effectively disabled. Meanwhile, if the drift stick is detected as being released in operation 326, then the next operation of the drift stick (i.e., return to operation 300) may potentially result in a drift, burnout or launch and the drift stick is considered to be re-enabled.

Returning back to operation 310, if the brake pedal 250 was held for longer than the hold threshold (time-based) or at a brake pressure greater than the hold threshold (pressure-based), but the accelerator pedal 260 is not engaged for longer than the BO threshold (which would result in moving through operation 312), then an alternate path through operation 330 may be possible instead. However, in some cases, the decision on whether to proceed from operation 310 to either operation 312 or 330 may be made based on timing. As such, operation 311 is shown in dashed lines as an optional timing based decision block. The timing involved may be the timing associated with holding the brake engaged, or holding the brake engaged above a given pressure. If the amount of time (T) the brake is depressed is less than a given value (x), then flow may proceed to operation 330. If the amount of time the brake is depressed is greater than the given value (x), then flow may proceed to operation 312. In other words, rather than having a first case where the accelerator is engaged simultaneous with holding the brake (as described above for operation 312), it may be instead be the case that the brake can be released and then whether to move to operation 312 or 330 (i.e., to burnout or launch) is determined based on how long the brake pedal was held depressed. In an example embodiment, an indication may be provided to the operator 125 (e.g., via status indicator 290) to indicate whether launch mode (i.e., proceeding to operation 330) or line-lock mode is engaged. Thus, for example, after operation 310, if the brake is being held, a launch mode indicator may be lit until T>x, at which time the indicator may change to a burnout mode indicator. The status indicator 290 may also indicate other statuses or situations as well (e.g., launch active/executed, burnout active/executed) at later points or other points of the process flow.

Operation 330 may include release of the brake pedal 250 within a threshold period of time after applying at least a minimum amount of break pressure. Thereafter, operation 332 may include pressing the accelerator pedal at least a threshold amount (e.g., at least a certain percentage of the full angular range of motion of the pedal). If the accelerator pedal is not pressed the threshold amount, the system may cycle and wait. When the accelerator pedal is finally pressed the threshold amount, such execution may indicate the intent of the operator 125 to conduct a launch operation. Thus, for example, the driver can press the brake pedal in operation 310, release the brake pedal within a certain number of seconds in operation 330, and then take some unspecified time before pressing the accelerator pedal beyond a percentage/angle threshold in operation 332. The system will wait for inputs without time dependency between operations 330 and 332 and then initiate the launch operation with depression of the accelerator pedal at least the threshold amount at operation 332. The launch operation itself may depend on the type of transmission of the vehicle 110 in some cases. Thus, a determination of transmission type may occur at operation 340. However, in some cases, no actual determination may be needed and instead, the operations 342 to 344 may be conducted for an automatic transmission, and operations 350 to 354 may be conducted for a manual transmission.

The sequence of releasing the brake pedal 250 within a specified time and then pushing the accelerator pedal 260 a threshold amount as noted by operations 330 and 332 may trigger the launch operation associated with either operations 342 and 344 (for automatic transmission vehicles) or operations 350, 352 and 354 (for manual transmission vehicles). Operation 342 may include the provision of the propulsion control signal 282 to build torque by the power unit 280 proportional to operation of the accelerator pedal 260 as the operator 125 continues to hold the accelerator pedal 260 depressed. Meanwhile, the brake control signal 272 is simultaneously applied to either apply full brake pressure to offset the building propulsion power, or by applying the brake control signal 272 to grow proportional to the increasing propulsion power (and therefore offset the propulsion power). Notably, the brake control signal 272 and corresponding brake pressures are applied without the brake pedal 250 being depressed. Moreover, the brake pedal 250 is (at this time) not depressed at all (or is at least depressed less than a specific threshold amount). Then, at operation 344, the drift stick is released and the braking forces are released (i.e., provision of the brake control signal 272 is stopped) to enable the vehicle to accelerate based on the built up propulsive forces. In other words, the torque that was offsetting launch is released, and torque is applied according to the regular accelerator pedal mapping (and therefore is based on accelerator pedal position 262).

If the vehicle has a manual transmission, then operation 350 may include the operator 125 keeping his/her foot off the brake pedal 250 (at least a minimum amount). Meanwhile, the brake control signal 272 may be applied to supply sufficient brake pressure to keep the vehicle 110 stationary, and brake pressure may also be dynamically adjusted to counteract any wheel torque generated by the power unit 280. The operator 125 may also press the clutch at least a threshold amount to reduce the physical connection between the power unit 280 (i.e., torque source) and the torque converter or automatic slipping clutch. The propulsion control signal 282 may also be provided to build torque by the power unit 280 proportional to operation of the accelerator pedal 260 as the operator 125 continues to hold the accelerator pedal 260 depressed beyond the threshold of operation 332.

The fact that the manual transmission is used may necessitate operation 352, which may include performing guided clutch modulation prior to launch. A gauge (e.g., as part of the user interface 120) may be provided to indicate optimal clutch pedal application in order to achieve an optimal launch operation. Lights in the gauge may be progressively lit to indicate cutch engagement states. For example, the lights may progressively indicate a scale of clutch engagement or clutch torque that extends from low to high. An optimal launch may avoid excessive torque to overheat the clutch, and also provide sufficient acceleration. During operation 352, the power unit 280 may maintain RPM control by adjusting output torque to match the clutch torque, which is applied by the operator 125. An excessive amount of clutch torque may lead to an aborted launch, and a notification may be provided to the operator 125 to indicate to the operator 125 that the clutch should be depressed. Otherwise, the torque source (e.g., the power unit 280) may be automatically decreased or even shut off.

Then, at operation 354, the drift stick and the clutch are each released and the braking forces are released (i.e., provision of the brake control signal 272 is stopped) to enable the vehicle to accelerate based on the built up propulsive forces. In other words, the torque that was offsetting launch is released, and torque is applied according to the regular accelerator pedal mapping (and therefore is based on accelerator pedal position 262). After operation 344 or 354, the system may be reset and ready to operate again the next time the drift stick is actuated (returning to operation 300).

Operations 342 and 344, or operations 350, 352 and 354, may be referred to as a launch process, which result in a launch operation (i.e., after execution of operation 344 or 354). The launch process may be executed based on receipt of a launch indication, which is provided by performing operations 310, 330 and 332 in sequence after the initial operations of engaging (i.e., actuating) the drift stick at operation 300 and confirming speed below the drift threshold at operation 302 have been performed.

Figure 4:
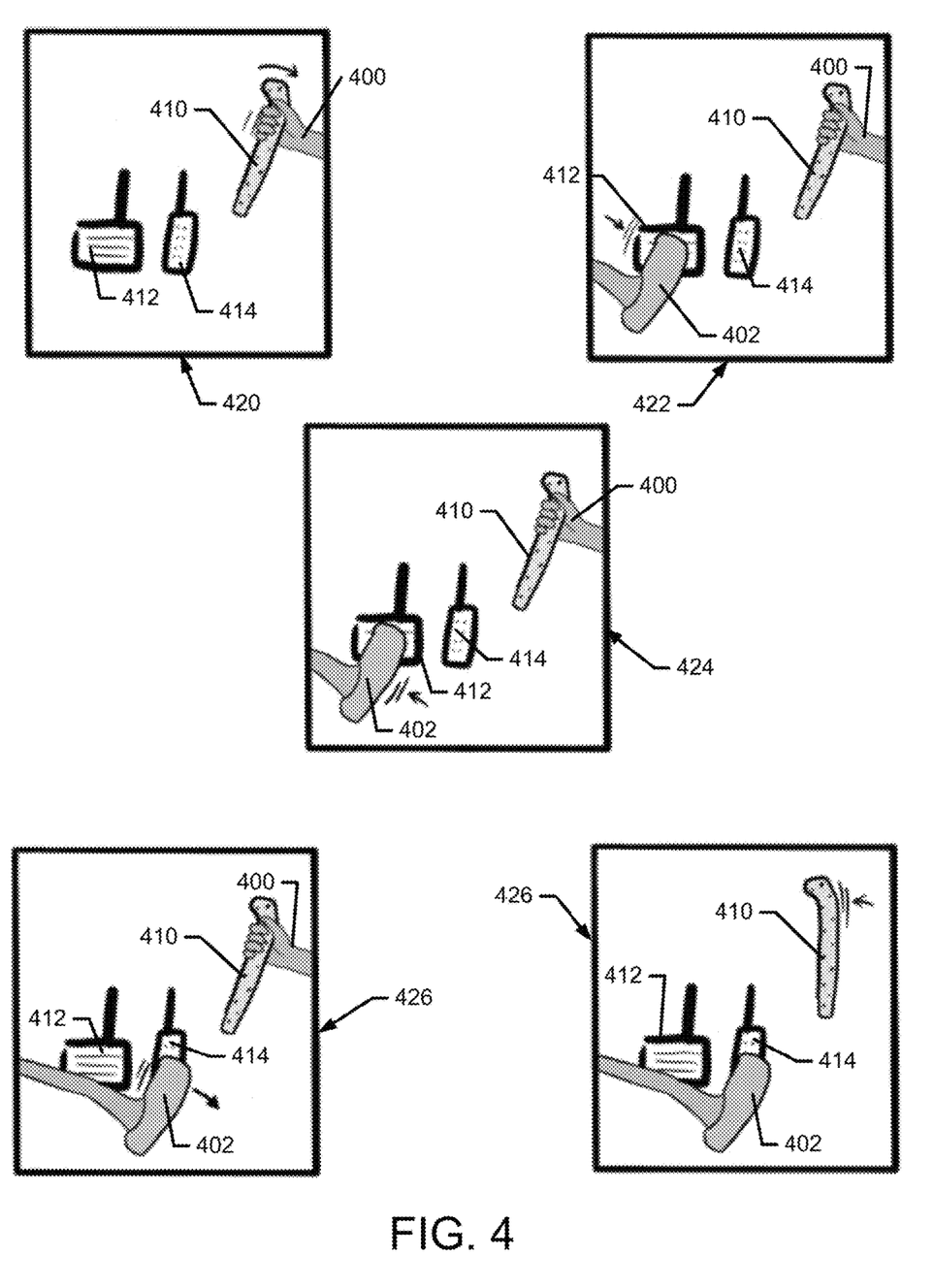
FIG. 4 illustrates a graphical representation of operations associated with a launch operation for an automatic transmission in accordance with an example embodiment.
Figure 5:
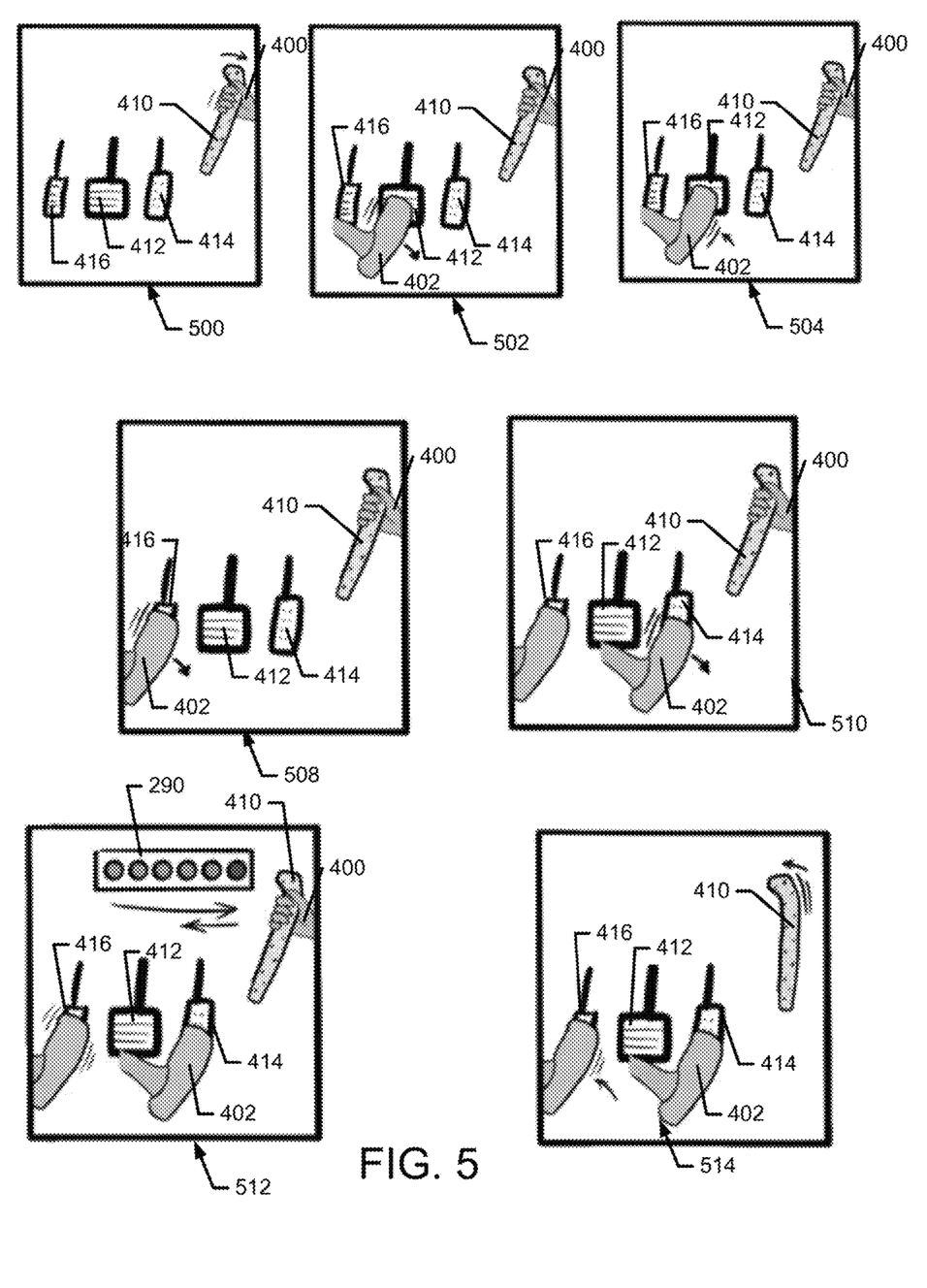
FIG. 5 illustrates a graphical representation of operations associated with a launch operation for a manual transmission in accordance with an example embodiment.

FIG. 4 illustrates a graphical representation of the operations associated with launch as described above in relation to operations 300 to 344. FIG. 5 illustrates a graphical representation of the operations associated with launch as described above in relation to operations 300 to 354.

As shown in FIG. 4, the operator's hand 400 pulls the drift stick 410 while neither the brake pedal 412 nor the accelerator pedal 414 is pressed (completing operation 300) in a first step shown as scene 420. Then in scene 422, the operator's foot 402 holds the brake pedal for longer than the hold threshold (completing operation 310 and assuming vehicle speed is less than the drift threshold). Thereafter, scene 424 shows release of the brake pedal 412 to complete operation 330. The accelerator pedal 414 may then be pressed to indicate the desire to conduct a launch as shown in scene 426 and described in relation to operation 332. Scene 428 then shows the launch occurring subsequent to operations 342 and 344 above.

Meanwhile, as shown in FIG. 5, the operator's hand 400 pulls the drift stick 410 while neither the brake pedal 412 nor the accelerator pedal 414 or clutch 416 is pressed (completing operation 300) in a first step shown as scene 500. Then in scene 502, the operator's foot 402 holds the brake pedal for longer than the hold threshold (completing operation 310 and assuming vehicle speed is less than the drift threshold). Thereafter, scene 504 shows release of the brake pedal 412 to complete operation 330. The clutch pedal 416 may be pressed in scene 508 and the accelerator pedal 414 may then be pressed to indicate the desire to conduct a launch as shown in scene 510 and described in relation to operations 332 and 350 above. Scene 512 shows the performance of foot modulation as described in operation 352 above to generate the status indicator 290 (e.g., in the form of a clutch engagement indicator or gauge). Scene 514 then shows the launch occurring subsequent to operation 354 above.

Figure 6:
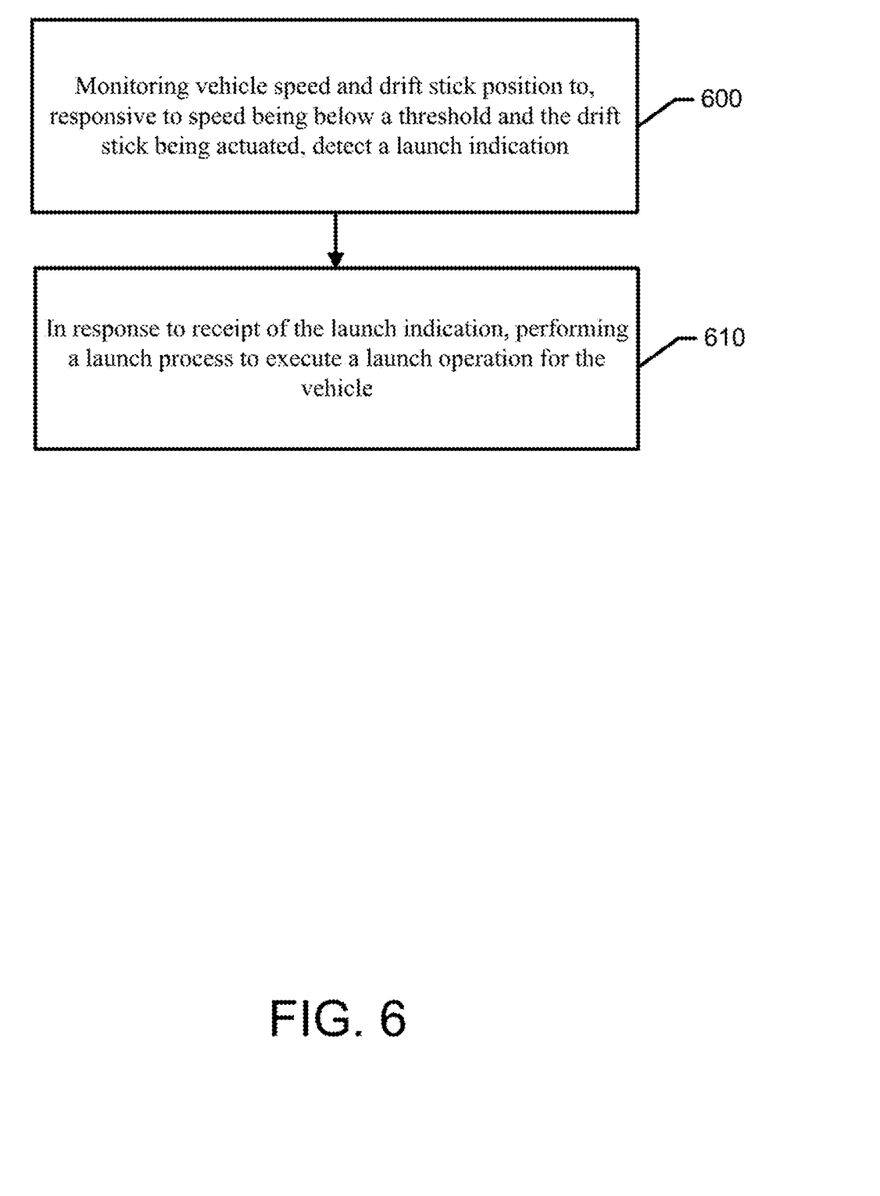
FIG. 6 a method of operating a vehicle control system in accordance with an example embodiment.

As may be appreciated from the description above, a vehicle control system that is configured to perform various useful methods may be provided. The control system may include a brake assembly having a brake actuator that operates brakes to apply braking forces to wheels of the vehicle when actuated, a propulsion system having a propulsion actuator operable to apply propulsive forces to at least some of the wheels when actuated, a hand-operated actuator, and processing circuitry operably coupled to the hand-operated actuator, the propulsion system, and the brake assembly. The processing circuitry may be configured to apply a balancing brake force to balance the propulsive forces generated based on actuation of the propulsion actuator while the vehicle is below a threshold speed and both the hand-operated actuator is actuated and the brake actuator is not actuated, and release the braking forces when the hand-operated actuator is released as part of a method of providing automatic vehicle control functions. FIG. 6 illustrates a block diagram of such a method.

As shown in FIG. 6, the method may include monitoring vehicle speed and drift stick position (i.e., the hand-operated actuator) to, responsive to speed being below a threshold and the drift stick being actuated, detect a launch indication at operation 600. In response to receipt of the launch indication, the method may further include performing a launch process to execute a launch operation for the vehicle at operation 610. The system and method of some embodiments may include additional features, modifications, augmentations and/or the like to achieve further objectives or enhance performance of the system/method. The additional features, modifications, augmentations and/or the like may be added in any combination with each other. Below is a list of various additional features, modifications, and augmentations that can each be added individually or in any combination with each other. In an example embodiment, the hand-operated actuator may be released to cause the launch operation for the vehicle based on the propulsive forces generated not being balanced by the balancing brake force. In some cases, the launch operation may be executed responsive to performing a launch process that is executed responsive to receipt of a launch indication. In an example embodiment, the launch indication may include receiving an indication of actuation of the brake actuator for at least a hold threshold, and receiving an indication of release of the brake actuator for less than a first time period prior to receiving an indication of actuation of the propulsion actuator for more than a threshold amount. In some cases, the launch process may include applying the balancing brake force as a full brake force of the brake assembly while the propulsive forces build responsive to actuation of the propulsion actuator, and initiating the launch operation when the hand-operated actuator is released to release the balancing brake force. In an example embodiment, the launch process may include applying the balancing brake force as a growing brake force of the brake assembly that grows to offset the propulsive forces that build responsive to actuation of the propulsion actuator, and initiating the launch operation when the hand-operated actuator is released to release the balancing brake force. As another alternative, the launch process may include applying the balancing brake force to the brake assembly and guiding an operator through clutch modulation of a clutch actuator to build the propulsive forces responsive to actuation of the propulsion actuator, and initiating the launch operation when the hand-operated actuator is released to release the balancing brake force while releasing the clutch actuator. In an example embodiment, guiding the operator may include providing a graphical display of clutch torque relative to a desired range of clutch torque for optimization of the launch operation.

As an alternative to the method of FIG. 6, the processing circuitry may be operably coupled to the hand-operated actuator, the propulsion system, and the brake assembly to initiate a line-lock feature responsive to receipt of a burnout indication provided by an operator of the vehicle when vehicle speed is below a threshold and the hand-operated actuator is actuated. In this context, the burnout indication may include actuating the brake actuator for greater than a first period of time, and subsequently fully actuating the propulsion actuator for greater than a threshold amount. In an example embodiment, the line-lock feature may include enabling front wheels to be stopped independent of rear wheels. The processing circuitry may further control the application of the propulsive forces applied by the propulsion system to the rear wheels while the braking forces are applied to the front wheels. In some cases, the line-lock feature may be terminated responsive to release of the hand-operated actuator by the operator. In an example embodiment, the propulsive forces may correspond to pedal position after the release of the hand-operated actuator. In some cases, the processing circuitry may control the application of the propulsive forces by controlling wheel speed of the rear wheels and power unit power. In an example embodiment, the line-lock feature may be ended responsive to release of the hand-operated actuator by the operator. In some cases, the line-lock feature may instead be ended responsive to vehicle speed exceeding a predetermined threshold. In such cases, the hand-operated actuator may be functionally disabled until the hand-operated actuator has been released by the operator.

Example embodiments may enable effective or even optimized ability for operators to initiate any or all of drift, burnout and launch with minimal human to machine interface in a very intuitive way. In this regard, the operator is provided with a relatively simple way to signal intent, and then the control system operates to deliver performance according to the signaled intent.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A control system for a vehicle, the control system comprising:
    a brake assembly comprising a brake actuator that operates brakes to apply braking forces to wheels of the vehicle when actuated;
    a propulsion system comprising a propulsion actuator operable to apply propulsive forces to at least some of the wheels when actuated;
    a hand-operated actuator; and
    processing circuitry operably coupled to the hand-operated actuator, the propulsion system, and the brake assembly,
    the processing circuitry initiating a line-lock feature responsive to determining that a burnout indication is provided by an operator of the vehicle when a speed of the vehicle is determined to be below a threshold and the hand-operated actuator is determined to be actuated by the operator of the vehicle;
    wherein determining that the burnout indication is provided comprises determining that the brake actuator has been actuated for greater than a predetermined first period of time, and subsequently determining that the propulsion actuator has been fully actuated for greater than a predetermined second period of time.

2. The system of claim 1, wherein the line-lock feature comprises enabling front wheels to be stopped independent of rear wheels, and
    wherein the processing circuitry further controls the application of the propulsive forces applied by the propulsion system to the rear wheels while the braking forces are applied to the wheels.

3. The system of claim 2, wherein the line-lock feature is terminated responsive to release of the hand-operated actuator by the operator.

4. The system of claim 3, wherein the propulsive forces correspond to pedal position after the release of the hand-operated actuator.

5. The system of claim 2, wherein the processing circuitry controls the application of the propulsive forces by controlling wheel speed of the rear wheels of and power unit power.

6. The system of claim 2, wherein the line-lock feature is ended responsive to vehicle speed exceeding a predetermined threshold.

7. The system of claim 2, wherein the line-lock feature is ended responsive to vehicle speed exceeding a predetermined threshold and release of the hand-operated actuator does not end the line-lock feature.

8. A control system for a vehicle, the system comprising:
    a brake actuator that causes braking forces to be applied to wheels of the vehicle when the brake actuator is actuated;
    a propulsion actuator that causes propulsive forces to be applied to at least some of the wheels when the propulsion actuator is actuated;
    a hand-operated actuator; and
    processing circuitry operably coupled to the hand-operated actuator, the brake actuator, and the propulsion actuator;
    wherein the processing circuitry initiates a line-lock feature in response to determining that a burnout indication is being provided while a speed of the vehicle is determined to be below a threshold speed and the hand-operated actuator is determined to be actuated by the by an operator of the vehicle;
    wherein determining that the burnout indication is being provided comprises determining that the brake actuator has been actuated for greater than a predetermined first period of time, and subsequently determining that the propulsion actuator has been actuated for greater than a predetermined second period of time.

* * * * *

UNITED STATES PATENT AND TRADEMARK OFFICE
CERTIFICATE OF CORRECTION

PATENT NO. : 11,472,410 B2
APPLICATION NO. : 17/196360
DATED : October 18, 2022
INVENTOR(S) : Pettersson Page 1 of 1

It is certified that error appears in the above-identified patent and that said Letters Patent is hereby corrected as shown below:

In the Claims

In Column 14, Claim 2, Line 7, "the wheels" should read --the front wheels--

In Column 14, Claim 5, Line 16, "rear wheels of and power unit power" should read --rear wheels and power unit power--

In Column 14, Claim 8, Line 41, "by the by an operator" should read --by an operator--

Signed and Sealed this
Fourteenth Day of February, 2023

Katherine Kelly Vidal
*Director of the United States Patent and Trademark Office*